US012793171B2

(12) United States Patent
Reddy et al.

(10) Patent No.: US 12,793,171 B2
(45) Date of Patent: Nov. 10, 2026

(54) RE-DIMENSIONING IMAGES BASED ON FOREGROUND OBJECTS

(71) Applicant: Adobe Inc., San Jose, CA (US)

(72) Inventors: Vangala Naveen Reddy, Hyderabad (IN); Umang Moorarka, Bilaspur (IN); Kunal Kumar Jain, Chennai (IN)

(73) Assignee: Adobe Inc., San Jose, CA (US)

( * ) Notice: Subject to any disclaimer, the term of this patent is extended or adjusted under 35 U.S.C. 154(b) by 369 days.

(21) Appl. No.: 18/405,097

(22) Filed: Jan. 5, 2024

(65) Prior Publication Data

US 2025/0225609 A1 Jul. 10, 2025

(51) Int. Cl.

| | |
|---|---|
| ***G06T 3/40*** | (2024.01) |
| ***G06T 5/77*** | (2024.01) |
| ***G06T 7/194*** | (2017.01) |
| ***G06T 7/70*** | (2017.01) |
| ***G06V 10/25*** | (2022.01) |
| ***G06V 10/56*** | (2022.01) |
| ***G06V 10/60*** | (2022.01) |

(52) U.S. Cl.

CPC .................. *G06T 3/40* (2013.01); *G06T 5/77* (2024.01); *G06T 7/194* (2017.01); *G06T 7/70* (2017.01); *G06V 10/25* (2022.01); *G06V 10/56* (2022.01); *G06V 10/60* (2022.01); *G06V 2201/09* (2022.01)

(58) Field of Classification Search

CPC .. G06T 3/40; G06T 7/194; G06T 7/70; G06T 5/77; G06V 10/25; G06V 10/56; G06V 10/60; G06V 2201/09

See application file for complete search history.

(56) References Cited

U.S. PATENT DOCUMENTS

| | | | | |
|---|---|---|---|---|
| 7,028,255 B1 | 4/2006 | Ayers | | |
| 11,233,920 B1 * | 1/2022 | Wang | .................. | H04N 1/0044 |
| 2024/0311960 A1 * | 9/2024 | Feng | .................... | G06T 3/4046 |

OTHER PUBLICATIONS

End-to-End Visual Editing with a Generatively Pre-Trained Artist (Year: 2022).*

Time-of-Day Neural Style Transfer for Architectural Photographs (Year: 2022).*

Foreground-Preserving Background Modification: A Deep Learning Approach (Year: 2023).*

Adobe Inc. , "Adobe Photoshop and Lightroom API", Adobe Developer [retrieved Mar. 14, 2024]. Retrieved from the Internet < https://developer.adobe.com/photoshop/photoshop-api-docs/>, 1 page.

(Continued)

*Primary Examiner* — Vu Le
*Assistant Examiner* — Matthew James Bodnark
(74) *Attorney, Agent, or Firm* — FIG. 1 Patents

(57) ABSTRACT

In implementation of techniques for re-dimensioning images based on foreground objects, a computing device implements a re-dimension system to receive a digital image and an input specifying an update to a dimension of the digital image. The re-dimension system then generates, using the machine learning model, a re-dimensioned background by changing the background based on the update to the dimension specified by the input. Using the machine learning model, the re-dimension system generates a re-dimensioned digital image by positioning the foreground object over the re-dimensioned background. The re-dimension system then displays the re-dimensioned digital image in a user interface.

20 Claims, 13 Drawing Sheets

(56) References Cited

OTHER PUBLICATIONS

Clio, “Clio API Documentation (v4)”, Clio Developers, Themis Solutions Inc. [retrieved Mar. 14, 2024]. Retrieved from the Internet <https://docs.developers.clio.com/api-reference/>, 768 pages.

* cited by examiner

RE-DIMENSIONING IMAGES BASED ON FOREGROUND OBJECTS

BACKGROUND

A digital image is a representation of visual information in a digital format, stored and processed by a computer. The digital image is displayed in a user interface using collections of pixels, which are basic units of a digital image that represent a single color or level of brightness displayed in the user interface. Additional visual content, including text and vector or raster graphics, is incorporated into a digital image using a digital image editing system, which is capable of editing content in the digital image by adjusting pixels of the digital image. Existing digital image systems, however, are limited to editing content contained in the digital image, resulting in visual inaccuracies, computational inefficiencies, and increased power consumption.

SUMMARY

Techniques and systems for re-dimensioning images based on foreground objects are described. In an example, a re-dimension system receives a digital image and an input specifying an update to a dimension of the digital image.

The re-dimension system segments a foreground object from a background in the digital image using a machine learning model. For example, the re-dimension system tags and assigns a bounding box to the foreground object using the machine learning model. In some examples, the foreground object is a logo or text depicted in the digital image.

Using the machine learning model, the re-dimension system generates a re-dimensioned background by changing the background based on the update to the dimension specified by the input. In some examples, the re-dimension system generates an extended portion of the re-dimensioned background using the machine learning model. Additionally, or alternatively, the re-dimension system generates an extended portion of the foreground object in the using the machine learning model based on determining whether the foreground object is cropped in the digital image.

The re-dimension system generates, using the machine learning model, a re-dimensioned digital image by positioning the foreground object over the re-dimensioned background. In some examples, the re-dimension system fills in a hole in the re-dimensioned background in the re-dimensioned digital image resulting from repositioning the foreground object in the re-dimensioned digital image using the machine learning model. Additionally or alternatively, the re-dimension system blends the foreground object with the re-dimensioned background by adjusting at least one of lighting, contrast, or color tone of the foreground object and the re-dimensioned background. The re-dimension system then displays the re-dimensioned digital image in a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Digital images are composed of collections of pixels that represent a single color or level of brightness displayed in a user interface. Conventional digital image editing systems allow users to manually edit digital images by adjusting pixels of the digital images. The conventional digital image editing systems, for instance, facilitate cropping or scaling the digital image, but are unable to expand content beyond a footprint of the dimensions of the digital image or reposition content within the digital image. This presents challenges in situations where a user desires multiple versions of the digital image with different dimensions.

For example, digital images are frequently used in advertisements. A digital image created for a marketing campaign includes a first advertisement for display on a mobile device that has a vertical orientation with dimensions of 3 inches×6 inches. However, the marketing campaign also involves advertising on computer screens, and a second advertisement that has a horizontal orientation with dimensions of 17 inches×14 inches is desired. The conventional digital image editing techniques allow the user to crop a portion of the first advertisement and scale a remainder of the first advertisement to fit the dimensions of the second advertisement. However, this removes a large portion of the advertisement, and important content is lost, including an object that is the focus of the first advertisement.

Techniques and systems for re-dimensioning digital images based on foreground objects are described that overcome these limitations. A re-dimension system begins in this example by receiving a digital image that depicts a foreground object layered over a background. The foreground object is a portion of the digital image that appears closer than the background, and depicts a person, an animal, an automobile, a product, or other object that is a focus of the digital image. In some situations, the foreground object is a logo or text. The background is an image captured by an image capture device or is a computer-generated image. In this example, the digital image includes a background that is an outdoor landscape image of mountains, and the foreground object depicts a person running in front of the mountains. The digital image is intended as an advertisement for running clothing, and additional sizes of the digital image are desired. For instance, the re-dimension system also receives an indication of an update to a dimension of the digital image that specifies at least one change to a dimension of the digital image. In this example, the digital image is horizontal with dimensions of 8 inches×5 images, and the re-dimension system receives an indication of an update to dimensions of the digital image, specifying a re-dimensioned digital image that is vertical with dimensions of 4 inches×6 inches, based on the digital image.

Figure 4:
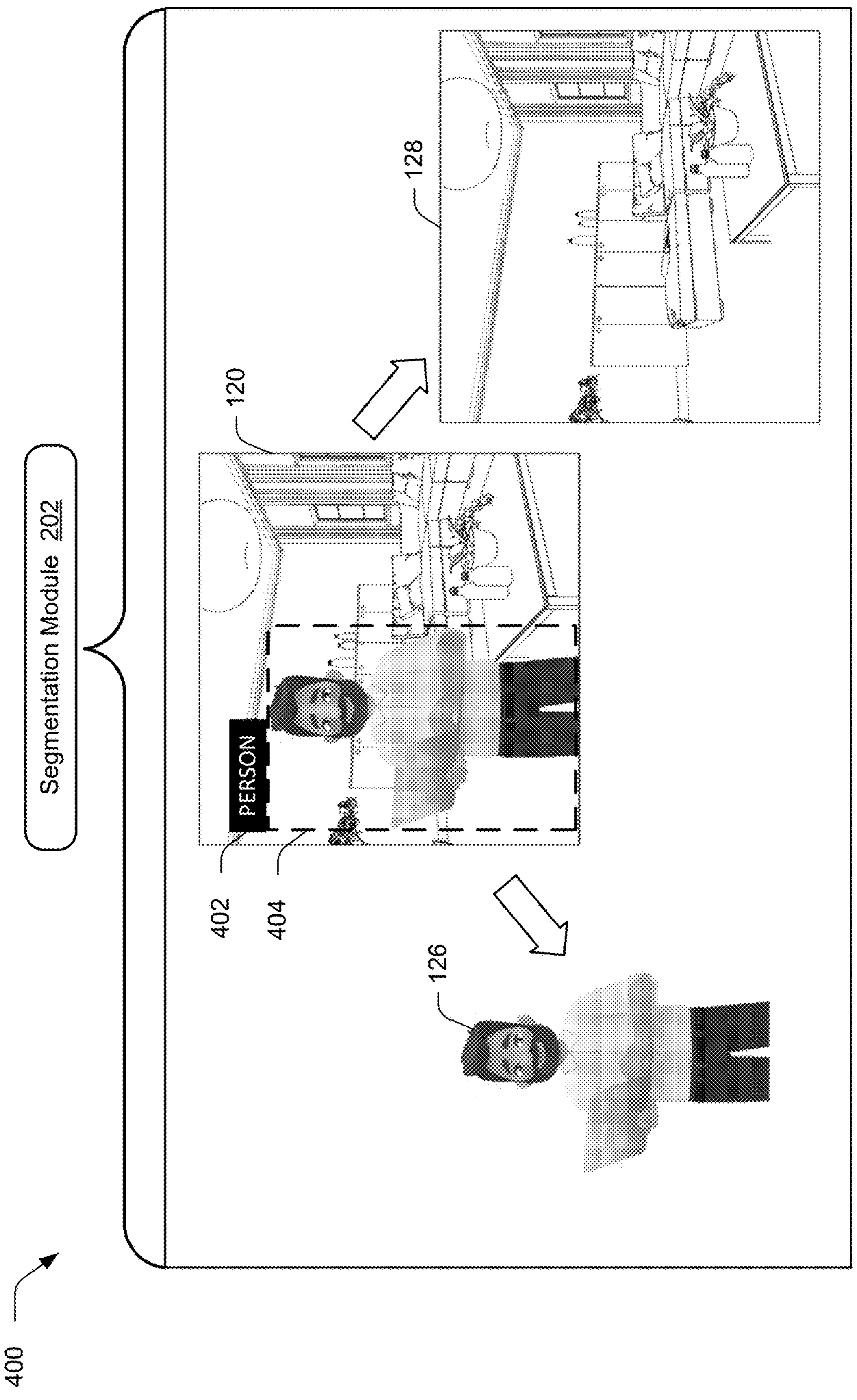
FIG. 4 depicts an example of a segmentation module segmenting a foreground object from a background of the digital image.
Figure 9:
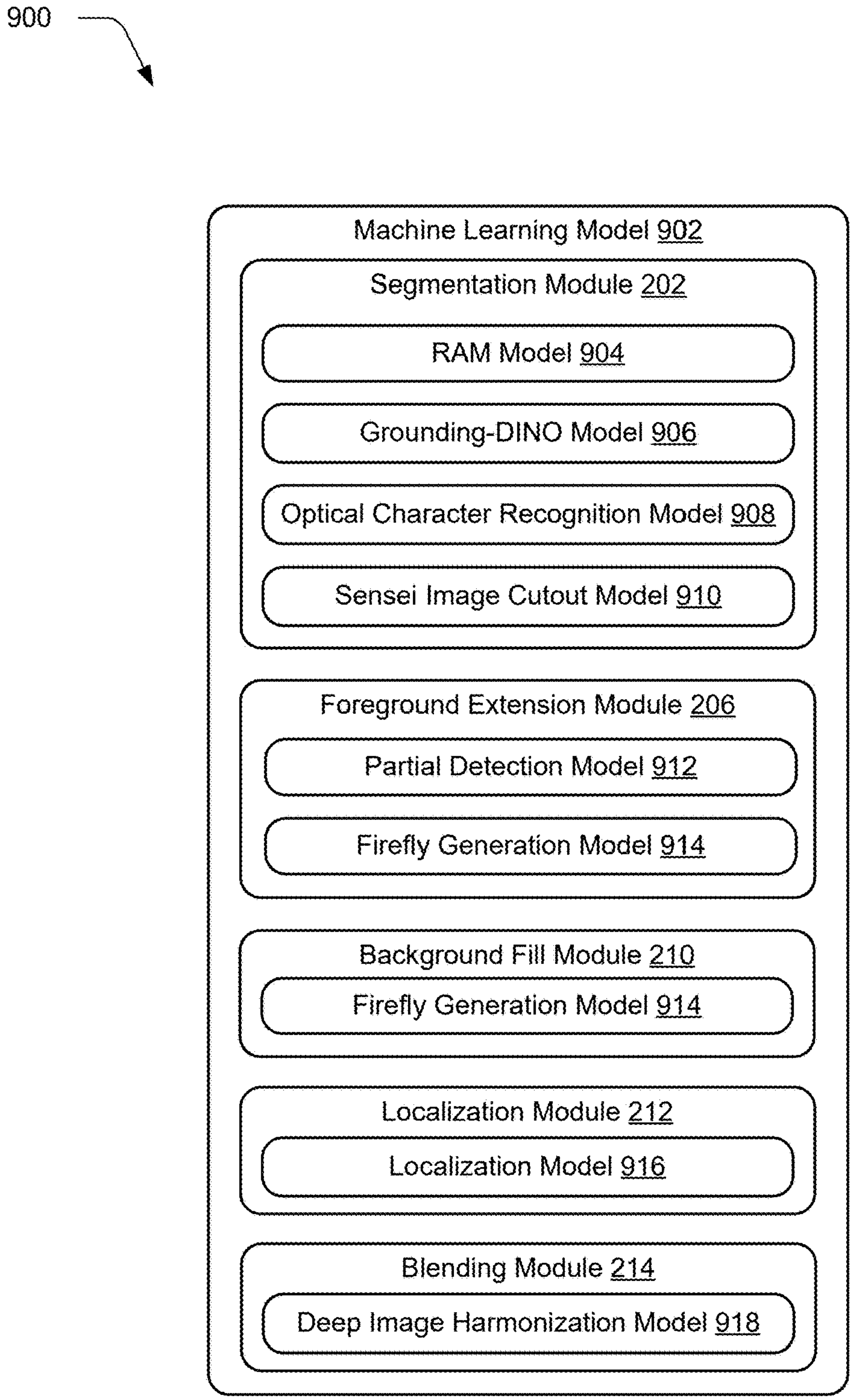
FIG. 9 depicts an example of the machine learning model.

To generate the re-dimensioned digital image with dimensions of 4 inches×6 inches, the re-dimensioning system begins by segmenting the foreground object from the background of the digital image using a machine learning model, which is described in further detail in relation to FIGS. 4 and 9. Segmenting the foreground object from the background allows the re-dimension system to re-dimension the background independently from the foreground object, which is later re-incorporated to ensure the foreground object is not lost when the background is re-dimensioned. The machine learning model detects the foreground object in the digital image and separates pixels corresponding to the foreground object from pixels corresponding to the background. Because segmenting the foreground object from the background reveals a hole in the pixels of the background left behind by removal of the foreground object, the machine learning model is configured to generate content to fill the background hole based on content of the background.

The re-dimensioning system then generates a re-dimensioned background by adjusting dimensions of the background based on the update to the dimensions. Updates involving decreasing a dimension include cropping a portion of the background, while updates involving increasing a dimension include extending a portion of the background. In this example, because the digital image is a horizontal image and the updates to the dimension specify a vertical image for the re-dimensioned digital image, the re-dimension system generates a re-dimensioned background by cropping a width of the background and extending a height of the background by adding an extension to the background. The re-dimension system uses the machine learning model to generate content to fill the extension to the background based on content of the background. In this example, the background includes the outdoor landscape image of mountains, and therefore the machine learning model fills the extension to the background with content that is a vertical extension of the outdoor landscape image of mountains.

In addition to generating content to fill a hole in the background or extensions to the background, the machine learning model is also configured to replace missing portions of the foreground object. This is because a portion of the foreground object is cropped out of the frame of the digital image in some examples. To allow for repositioning of the foreground object over the re-dimensioned background, the machine learning model replaces missing portions of the foreground object to complete the foreground object.

The re-dimension system then positions the foreground object over the re-dimensioned background. The re-dimension system uses the machine learning model to determine a position for the foreground object that results in a re-dimensioned digital image that is aesthetically-pleasing. For example, the machine learning model determines a focal point of the re-dimensioned background to place the foreground object at a prominent position that avoids covering up the focal point of the re-dimensioned background.

After positioning the foreground object over the re-dimensioned background, the re-dimension system harmonizes the foreground object with the re-dimensioned background by adjusting lighting, contrast, color tone, or other visual properties of the foreground object and the re-dimensioned background to generate a re-dimensioned digital image that is visually cohesive. The re-dimension system then outputs the re-dimensioned digital image for display in a user interface.

Re-dimensioning images based on foreground objects in this manner overcomes the technical challenges of conventional digital image editing techniques that are limited to editing content within the digital image. For example, the re-dimension system segments the foreground object from the background to independently position the foreground object over a re-dimensioned background to avoid cropping the foreground object out of the re-dimensioned background, which is not possible using conventional digital image editing techniques. The re-dimension system also generates content to fill holes in the background and to fill the extension to the background, which is also not possible using conventional digital image editing techniques that are limited to editing content within the digital image. Re-dimensioning images based on foreground objects in this manner generates a cohesive re-dimensioned digital image that retains a foreground object from a digital image repositioned in a prominent position over a re-dimensioned background.

Term Examples

As used herein, the term "foreground object" refers to an object or element positioned in a front portion of a scene in a digital image and is a primary subject in the scene. For example, the foreground object is the part of the digital image that appears closest to the viewer.

As used herein, the term "background" refers to a portion of a digital image that appears behind the foreground object. It is the area of the digital image that is visually set apart from the foreground, which typically contains the primary subjects of the scene.

As used herein, the term "bounding box" refers to a rectangular or cuboid-shaped area that encompasses a specific object or region of interest, including the foreground object, in a digital image or in three-dimensional space used for object detection, object recognition, and image annotation.

As used herein, the term "machine learning model" refers to a computer representation that is trained to perform a task absent specific instructions for performing the task. The machine learning model leverages algorithms to learn from known data and to generate outputs that reflect patterns and attributes of the known data. In this example, the machine learning model is a combination of different models to perform various functions of re-dimensioning images based on foreground objects. For example, the machine learning model collectively includes a Recognize Anything (RAM) model for image tagging, a Grounding-DINO model for object detection, an Optical Character Recognition detector model for text detection, a Sensei Image Cutout model for image segmentation, a Partial Detection model for detecting partial images, a Firefly Generation model for generating missing content in foreground objects and expanding digital images, a Localization model to determine positions of foreground objects, and a Deep Image Harmonization model to edit properties of digital images. These models are described in further detail below. Machine learning models use unsupervised learning, semi-supervised learning, supervised learning, or reinforcement learning. Other examples of machine learning models include clustering, linear regression, logistic regression, Bayesian networks, random forest learning, dimensionality reduction algorithms, boosting algorithms, artificial neural networks (e.g., fully-connected neural networks, deep convolutional neural networks, recurrent neural networks), deep learning, long short-term memory, and generative adversarial networks.

As used herein, the term “lighting” refers to the way light interacts with the subjects or objects within the digital image, and how these interactions are captured by a digital camera or sensor. The lighting is described in terms of intensity, which is a brightness of light in a digital image. In some examples, the lighting is also described in terms of color temperature, which describes a type of lighting based on a lighting source. For example, daylight produces neutral color temperature lighting, while artificial lighting sources produce warm color temperature lighting or cool color temperature lighting.

As used herein, the term “contrast” refers to a difference in visual properties between lighter and darker parts of a digital image. The contrast contributes to overall clarity, depth, and visual impact of the digital image or other digital visual content.

As used herein, the term “color tone” refers to an overall color cast or dominant color hue that characterizes a digital image, setting a mood, atmosphere, and visual style of the digital image. The color tone results from a combined influence of a color temperature of a light source, color characteristics of objects in a scene depicted in the digital image, and other color adjustments applied during post-processing. For example, warm color tones include predominant colors of red, orange, and yellow, while cool color tones include predominant colors of blue and green.

As used herein, the term “color saturation” refers to an intensity of a color. A level of color saturation is determined by calculating an aggregate saturation of hues present in facial skin, hair, or eyes.

As used herein, the term “color contrast” refers to a difference between different colors. A level of color contrast is determined by calculating a deviation of a person’s facial skin, hair, or eye brightness from the person’s average brightness.

As used herein, the term “white balancing” pertains to a process of removing unnatural color casts from a digital image so that objects that appear white in real life are rendered as white in a digital image. White balancing takes into account a color temperature of a light source, which refers to a relative warmth or coolness of white light.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

Figure 1:
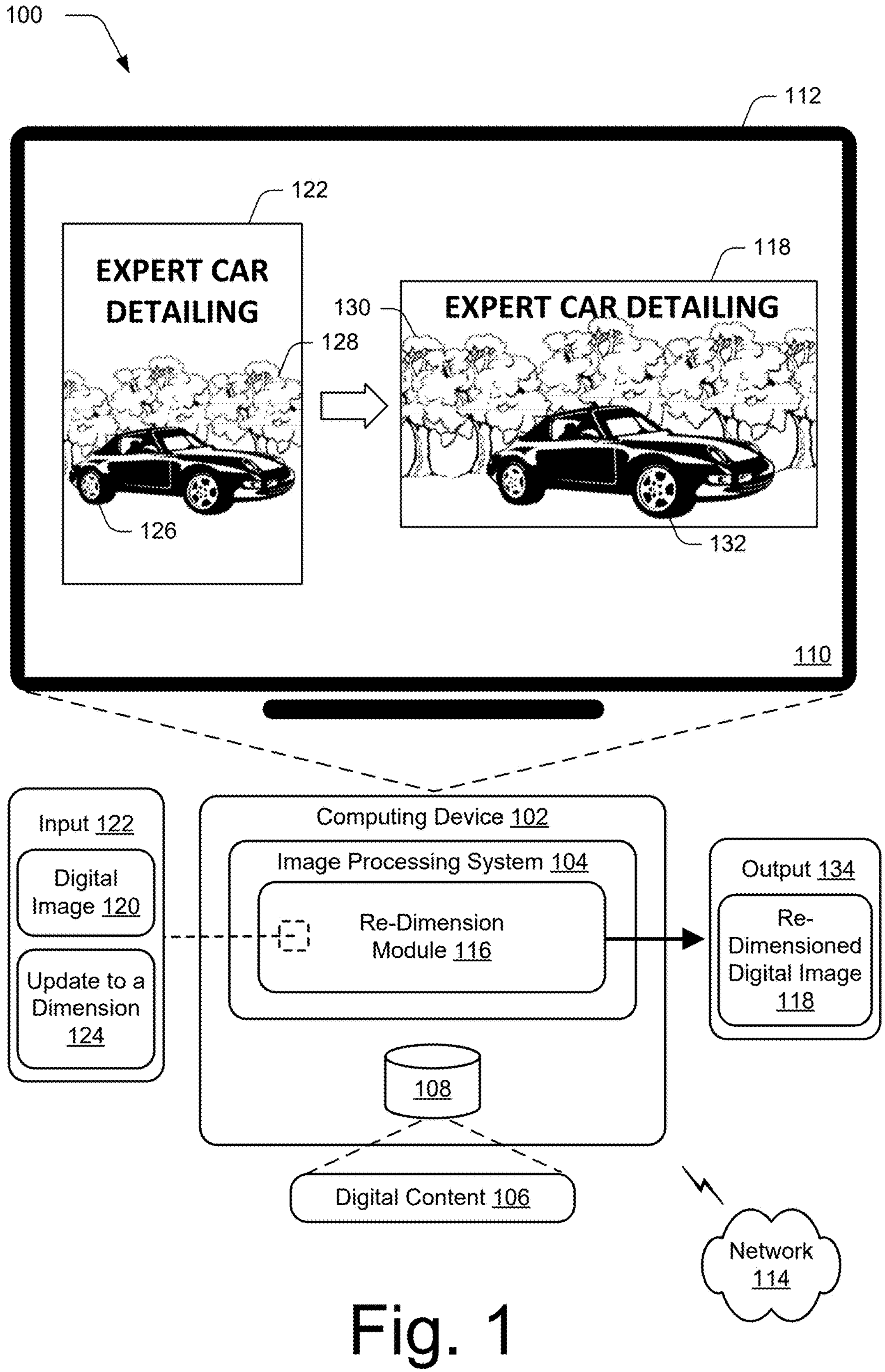
FIG. 1 is an illustration of a digital medium environment in an example implementation that is operable to employ techniques and systems for re-dimensioning images based on foreground objects as described herein.

FIG. 1 is an illustration of a digital medium environment 100 in an example implementation that is operable to employ techniques and systems for re-dimensioning images based on foreground objects described herein. The illustrated digital medium environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), an augmented reality device, and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices, such as multiple servers utilized by a business to perform operations “over the cloud” as described in FIG. 13.

The computing device 102 also includes an image processing system 104. The image processing system 104 is implemented at least partially in hardware of the computing device 102 to process and represent digital content 106, which is illustrated as maintained in storage 108 of the computing device 102. Such processing includes creation of the digital content 106, representation of the digital content 106, modification of the digital content 106, and rendering of the digital content 106 for display in a user interface 110 for output, e.g., by a display device 112. Although illustrated as implemented locally at the computing device 102, functionality of the image processing system 104 is also configurable entirely or partially via functionality available via the network 114, such as part of a web service or “in the cloud.”

The computing device 102 also includes a re-dimension module 116 which is illustrated as incorporated by the image processing system 104 to process the digital content 106. In some examples, the re-dimension module 116 is separate from the image processing system 104 such as in an example in which the re-dimension module 116 is available via the network 114.

The re-dimension module 116 is configured to generate a re-dimensioned digital image 118 based on a digital image 120. To do this, the re-dimension module 116 receives an input 122 including the digital image 120 and an indication of an update to a dimension 124, which specifies a change to at least one of the dimensions of the digital image 120. For example, the digital image 120 has dimensions of 1200×1800 pixels, and the update to the dimension 124 specifies dimensions of 2100×1500 pixels. Because the digital image 120 is a vertical image and the update to the dimension 124 specifies a horizontal image, content of the digital image 120 does not fill a 2100×1500 pixel space by merely enlarging the digital image 120. For this reason, the re-dimension module 116 re-arranges content of the digital image 120 to re-dimension the digital image 120 according to the update to the dimension 124.

The re-dimension module 116 first segments a foreground object 126 from a background 128 in the digital image 120 using a machine learning model. To do this, the machine learning model recognizes and tags objects in the digital image 120. The machine learning model uses object detection to generate bounding boxes corresponding to the tagged objects. The tagged objects include people, automobiles, buildings, text, logos, or other content in the foreground of the digital image 120. For a foreground object 126 corresponding to a tag of the tagged objects, the machine learning model then performs image segmentation on the foreground object 126 in the bounding box.

The re-dimension module 116 then generates a re-dimensioned background 130 by updating dimensions of the foreground object 126 according to the update to the dimension 124. In examples involving a decrease to a dimension of the digital image 120, the re-dimension module 116 crops the foreground object 126 according to the update to the dimension 124 to generate the re-dimensioned background 130. However, in examples involving an increase to a dimension of the digital image 120, the re-dimension module 116 uses the machine learning model to extend the foreground object 126 by generating content to fill a space between an edge of the foreground object 126 and an edge of the re-dimensioned background 130.

Based on the re-dimensioned background 130, the re-dimension module 116 generates a re-dimensioned digital image 132 by positioning the foreground object 126 over the re-dimensioned background 130. In some examples, the re-dimension module 116 re-sizes the foreground object 126 based on dimensions re-dimensioned background 130 and positions the foreground object 126 to avoid obscuring a focal point of the re-dimensioned background 130. Additionally, the re-dimension module 116 uses the machine learning model to patch holes in content of the re-dimensioned background 130 resulting from the foreground object 126 positioned over a different portion of the re-dimensioned background 130 than the background 128.

In some examples, the re-dimension module 116 uses the machine learning model to extend a portion of the foreground object 126 that is cropped out of the digital image 120 but included in the re-dimensioned digital image 118. For example, a person is featured on a left side of a digital image 120, and the person's right arm is cut off by the left edge of the digital image 120. The re-dimensioned digital image 118 is larger, and the person is featured in the center of the re-dimensioned digital image 118. To avoid featuring the person with a missing right arm in the re-dimensioned digital image 118, the re-dimension module 116 uses the machine learning model to generate a right arm for inclusion on the person in the re-dimensioned digital image 118.

The re-dimension module 116 harmonizes the foreground object 126 with the re-dimensioned background 130 by adjusting lighting, contrast, color tone, or other image properties of the foreground object 126 or the re-dimensioned background 130 of the re-dimensioned digital image 118 to produce a re-dimensioned digital image 118 that appears aesthetically uniform to viewers. The re-dimension module 116 then generates an output 134 including the re-dimensioned digital image 118 for display in the user interface 110.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Re-Dimensioning Images Based on Foreground Objects

Figure 2:
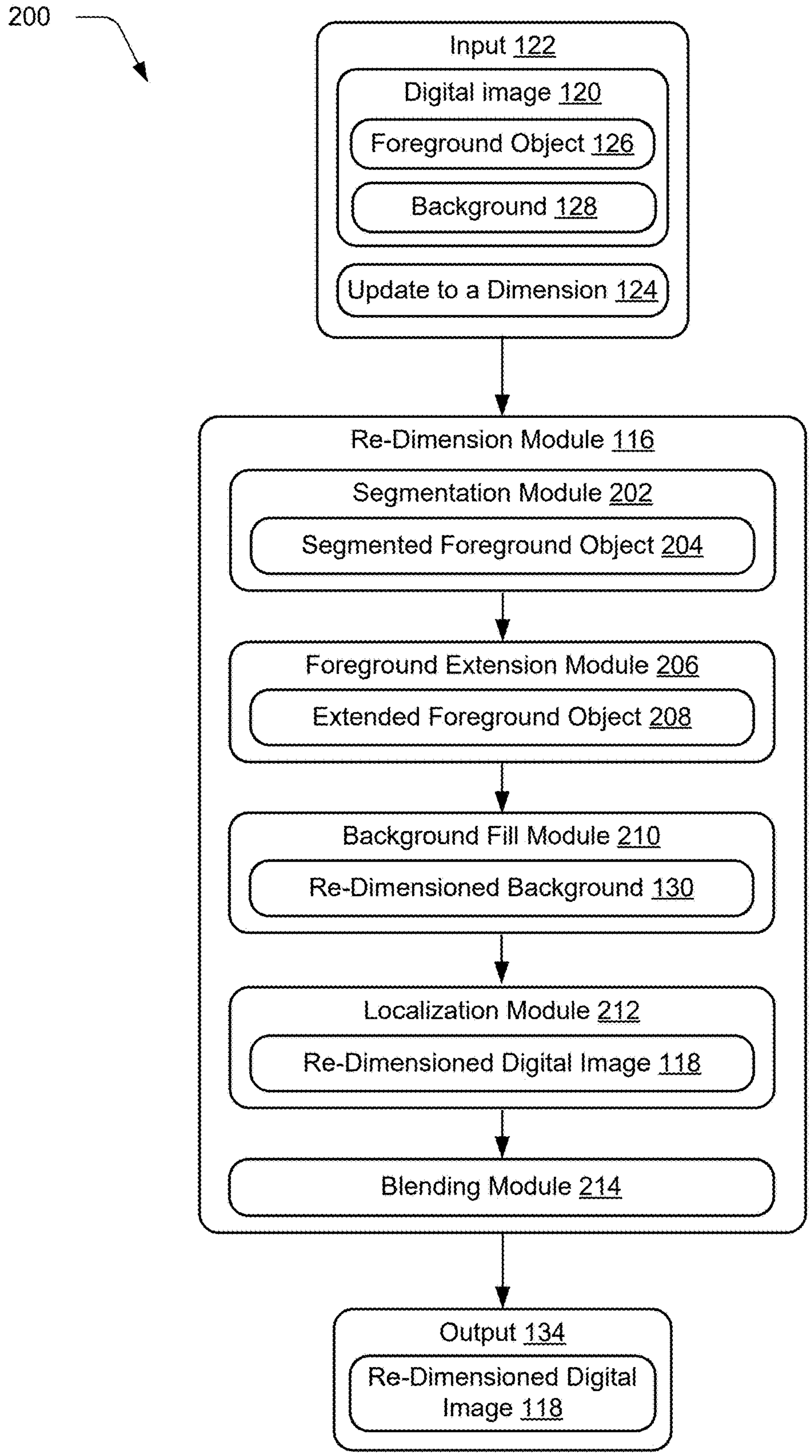
FIG. 2 depicts a system in an example implementation showing operation of a re-dimension module for re-dimensioning images based on foreground objects.

FIG. 2 depicts a system 200 in an example implementation showing operation of the re-dimension module 116 of FIG. 1 in greater detail. The following discussion describes techniques that are implementable utilizing the previously described systems and devices. Aspects of each of the procedures are implemented in hardware, firmware, software, or a combination thereof. The procedures are shown as a set of blocks that specify operations performed and/or caused by one or more devices and are not necessarily limited to the orders shown for performing the operations by the respective blocks. In portions of the following discussion, reference is made to FIGS. 1-13.

To begin in this example, the re-dimension module 116 receives an input 122 including a digital image 120 and an indication of an update to a dimension 124. The digital image 120 depicts a foreground object 126 layered over a background 128, which has a first set of dimensions. The update to the dimension 124 is selected by a user to generate a re-dimensioned digital image 118 based on the digital image 120, with a different set of dimensions than the first set of dimensions.

The re-dimension module 116 includes a segmentation module 202. The segmentation module 202 separates the foreground object 126 from the background 128, allowing the re-dimension module 116 to re-dimension the background 128 independently from the foreground object 126. To do this, the segmentation module 202 tags objects in a foreground of the digital image 120 and generates bounding boxes surrounding the objects. For an individual foreground object, the segmentation module 202 segments the foreground object 126 from the background 128 based on the bounding box, resulting in a segmented foreground object 204.

The re-dimension module 116 also includes a foreground extension module 206. In examples involving a foreground object 126 that is cut off by an edge of the digital image 120, the foreground extension module 206 generates a missing portion of the foreground object 126 for incorporation into the re-dimensioned digital image 118. For example, the foreground extension module 206 completes missing portions of the digital image 120 using a machine learning model trained on missing portions of foreground objects by generating a replacement portion 208 to fill the missing portion of the foreground object 126.

The re-dimension module 116 also includes a background fill module 210. The background fill module 210 generates a re-dimensioned background 130 by adjusting dimensions of the background 128 based on the update to the dimension 124. For example, the background fill module 210 crops the background 128 according to an update to the dimension 124 specifying a shortened dimension for the digital image 120, or expands a dimension of the background 128 according to the update to the dimension 124 specifying an increased dimension for the digital image 120. Because examples involving the increased dimension for the digital image 120 do not include content in the background 128 to fill re-dimensioned background 130 that is larger than the background 128, the background fill module 210 performs out-painting to extend sections of the digital image 120 to fill a footprint of the re-dimensioned background 130. The background fill module 210 also performs in-painting to fill holes in the re-dimensioned background 130 resulting from a foreground object 126 that is shifted, repositioned, or re-sized within the re-dimensioned digital image 118. To out-paint or in-paint content in the re-dimensioned background 130, the background fill module 210 uses a machine learning model trained on sections of missing content in background images to generate content for the out-paint or the in-paint content.

The re-dimension module 116 also includes a localization module 212. The localization module 212 selects an optimal placement for the incorporating the foreground object 126 onto the re-dimensioned background 130. In some examples, a position of the foreground object 126 on the re-dimensioned background 130 is different from a position of the foreground object 126 on the background 128. For example, the localization module 212 uses a machine learning model trained on optimal aesthetic placement of foreground objects on backgrounds to determine a placement for the foreground object 126 based on a focal point of the re-dimensioned background 130, salient content in the re-dimensioned background 130, readability of text over the re-dimensioned background 130, or other factors related to design of the re-dimensioned digital image 118.

The re-dimension module 116 also includes a blending module 214. The blending module 214 blends the foreground object 126 with the re-dimensioned background 130. In some examples, the foreground object 126 positioned on the re-dimensioned background 130 does not appear cohesive with the remainder of the re-dimensioned background 130. For instance, the foreground object 126 has different lighting, contrast, shadows, brightness or other factors from the re-dimensioned background 130 that contribute to an unaesthetic appearance of the re-dimensioned digital image 118 overall. To correct this, the blending module 214 adjusts visual properties of the foreground object 126, the re-dimensioned background 130, or both using a machine learning model trained on adjusting properties of foreground objects and backgrounds of digital images to generate visually cohesive images.

The re-dimension module 116 then generates an output 134 including the re-dimensioned digital image 118 for display. The re-dimensioned digital image 118 features content of the digital image 120, including the foreground object 126 and at least a portion of the background 128 of the digital image 120 in a different size or configuration than the digital image 120.

FIGS. 3-8 depict stages of re-dimensioning images based on foreground objects. In some examples, the stages depicted in these figures are performed in a different order than described below.

Figure 3:
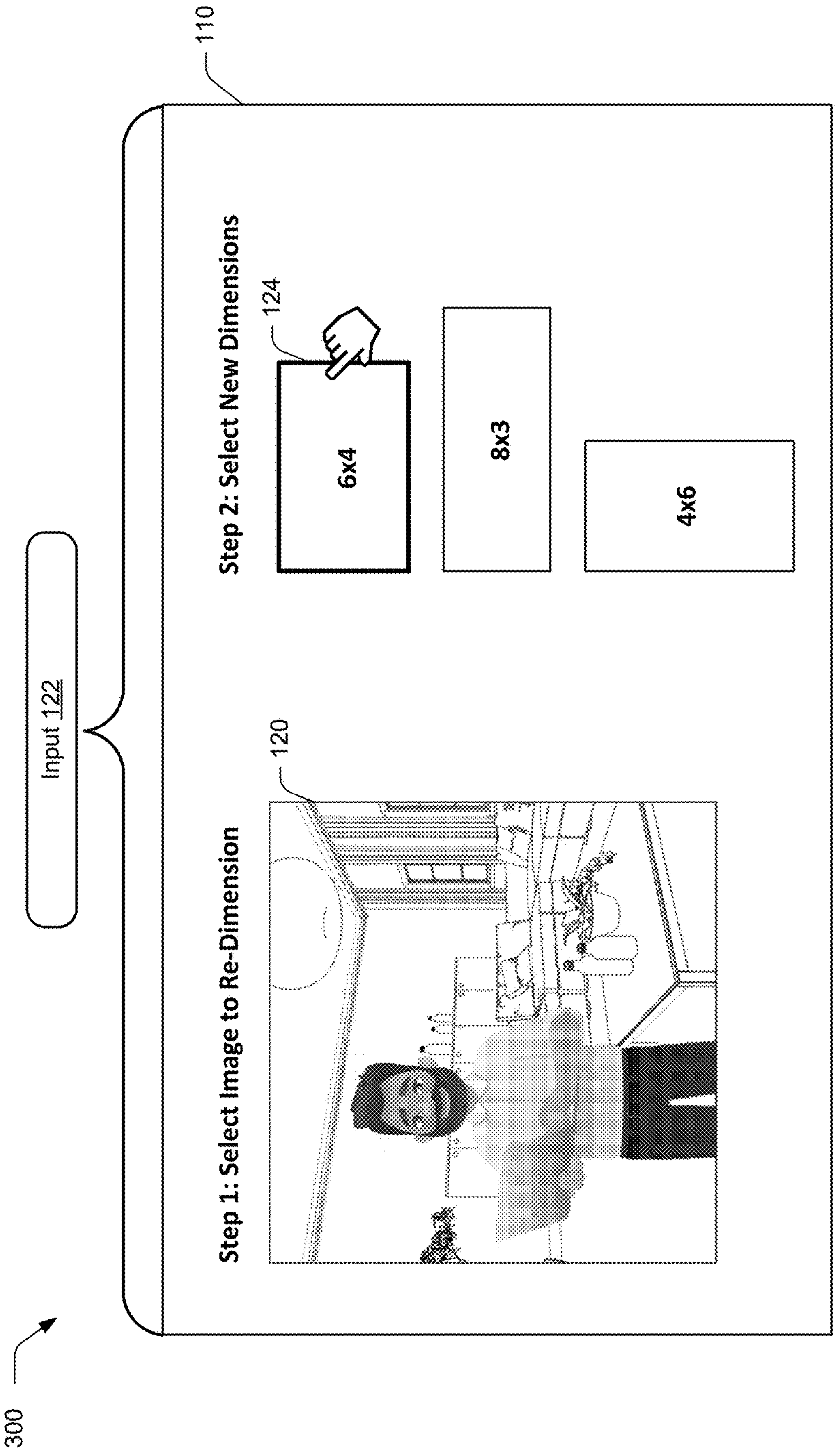
FIG. 3 depicts an example of receiving an input including a digital image and an update to a dimension.

FIG. 3 depicts an example 300 of receiving an input including a digital image and an update to a dimension. As illustrated, the re-dimension module 116 receives an input 122 including a digital image 120.

The digital image 120 depicts a foreground object 126, or multiple foreground objects, layered over a background 128. Examples of the foreground object 126 include a person, automobile, animal, or other salient object depicted in the digital image 120. In some examples, the foreground object 126 is a logo or text depicted in the digital image 120. The background 128 is a photograph, a computer-generated image, a pattern, a texture, a solid color, or any other digital content. In the digital image 120 in this example, the foreground object 126 features an image of a man holding a laptop computer, and the background 128 features an image of a living room scene.

In some examples, the digital image 120 is a photograph captured using an image capture device that depicts the foreground object 126. In other examples, the digital image 120 is a composite image including separate images for the foreground object 126 and the background 128 added together during post-processing to form the digital image 120.

The input 122 also includes an indication of an update to a dimension 124. The indication of the update to the dimension 124 is a user or computer selection of at least one updated dimension to form a re-dimensioned digital image 118 based on content of the digital image 120. In this example, the digital image 120 is a square 4 inch×4 inch image. The re-dimension module 116 receives a user selection of updated dimensions including a 6 inch×4 inch rectangle. Options are displayed in a user interface, offering the user convenience selection of multiple updated dimensions. Other depicted examples include a 8 inch×3 inch rectangle or a 4 inch×6 inch rectangle, although any dimensioned shape is contemplated for the indication of the update to the dimension 124. Although these examples include dimensions in units of inches, the dimensions in other examples are labeled in other measurements, including pixels.

FIG. 4 depicts an example 400 of a segmentation module 202 segmenting the foreground object 126 from a background 128 of the digital image 120. FIG. 4 is a continuation of the example described in FIG. 3. After the re-dimension module 116 receives an input 122 including the digital image 120 and the indication of the update to the dimension 124, the segmentation module 202 segments the foreground object 126 from the background 128.

The segmentation module 202 uses a "Recognize Anything" (RAM) model to generate a tag 402 for the foreground object 126 in the digital image 120. The RAM model is trained to recognize and assign tags to objects, faces, or patterns in digital images. The tag is a descriptive term or computer-readable code that identifies a specific object or a category of object. In this example, the tag identifies a person depicted in the digital image 120. In some examples, categories of tags are identified as predetermined foreground objects, including people, animals, automobiles, certain products in an advertisement, or other objects.

Using the tag for the foreground object 126, the segmentation module 202 uses a Grounding-DINO model to generate a bounding box 404 surrounding the foreground object 126. The Grounding-DINO model is a zero-shot object detection model generated by combining a Transformer-based DINO detector and grounded pre-training. The Transformer-based DINO detector is a self-supervised model trained to recognize representations from unlabeled data. In some examples involving the foreground object 126 as a logo or text, the segmentation module 202 uses a logo detector model or an Optical Character Recognition detector to generate the bounding box surrounding the foreground object 126. The Optical Character Recognition model converts images of text, including computer-generated, printed, or handwritten, into machine-encoded text, which is identified as a foreground object 126 and enclosed in the bounding box 404.

The segmentation module 202 then individually segments the foreground object 126 from the background 128 using a machine learning model. The bounding box 404 narrows a focus area of the segmentation to a smaller area of the digital image 120. In some examples, the segmentation module 202 uses Sensei Image Cutout to segment the foreground object 126 from the background 128. For example, the segmentation module 202 generates a black and white mask covering the foreground object 126 and segments pixels corresponding to the foreground object 126 from surrounding pixels corresponding to the background 128 based on the mask.

Figure 5:
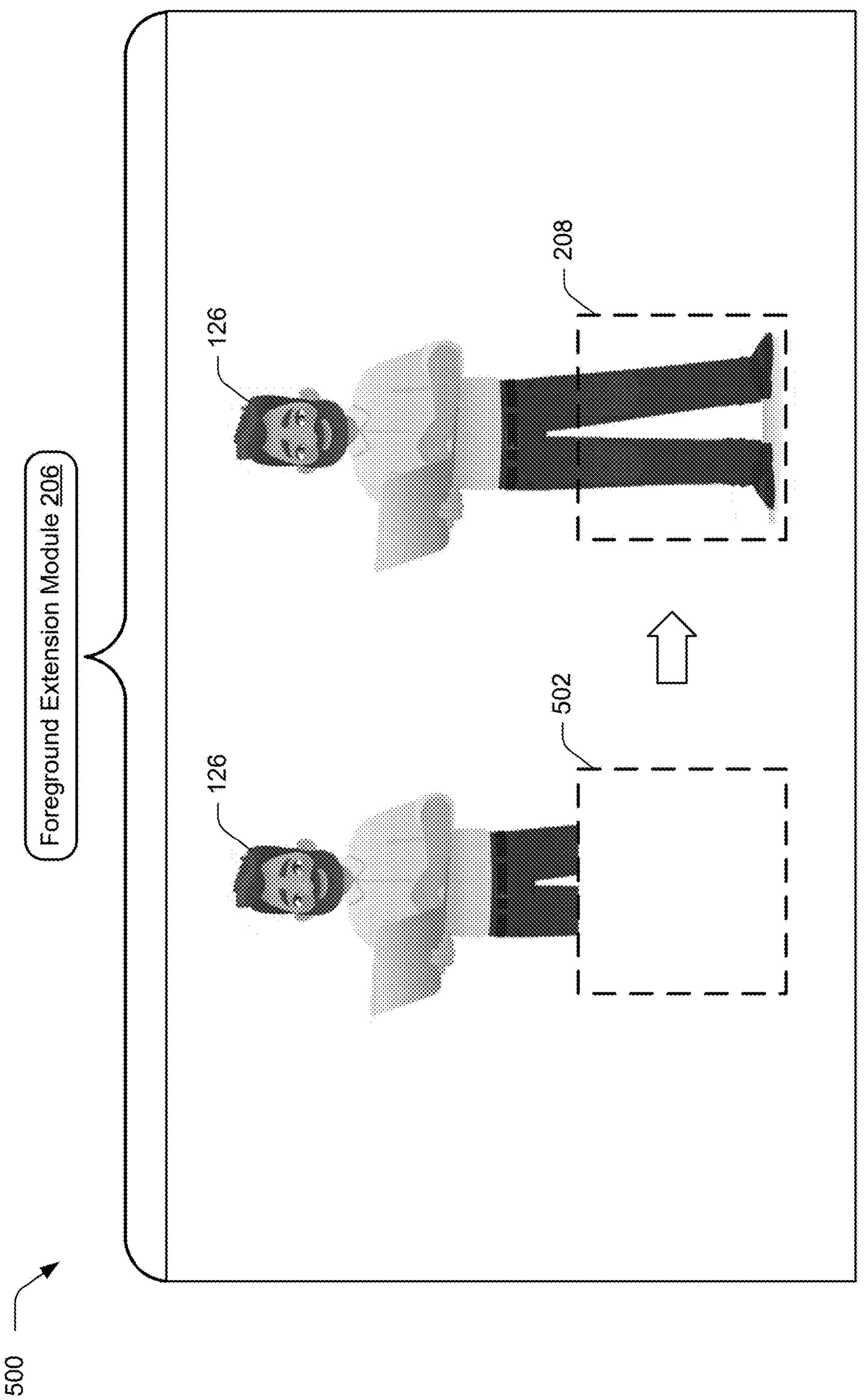
FIG. 5 depicts an example of a foreground extension module extending a portion of the foreground object.

FIG. 5 depicts an example 500 of a foreground extension module 206 extending a portion of the foreground object 126. FIG. 5 is a continuation of the example described in FIG. 4. After the foreground object 126 is segmented from the background 128, the foreground extension module 206 detects whether the foreground object 126 is cropped.

The foreground extension module 206 uses a Partial Detection model to determine whether the foreground object 126 is a partial image or is cropped. The Partial Detection model is a binary classifier trained on whole foreground objects and corresponding versions of the whole foreground objects that are missing a portion to determine whether the foreground object 126 is a partial foreground object or a full foreground object.

In this example, the foreground object 126 includes a missing portion 502. In the digital image 120, the foreground object 126 borders a bottom edge of the digital image 120, so a bottom portion of the foreground object 126 is cut off by the bottom edge of the digital image 120, which includes the man's legs in this example. The Partial Detection model determines that the foreground object 126 includes a missing portion 502.

To replace the missing portion 502, the foreground extension module 206 uses a Firefly generation model to generate a replacement portion 208 of the foreground object 126 to replace the missing portion 502. The Firefly generation model does this by extending a portion of the foreground object 126 bordering the missing portion 502. In some examples, the Firefly generation model uses the tag 402 as a prompt to generate the replacement portion 208. In this example, the foreground extension module 206 generates the replacement portion 208, including legs for the man depicted as the foreground object 126. This results in a foreground object 126 for placement in the re-dimensioned digital image 118.

Figure 6:
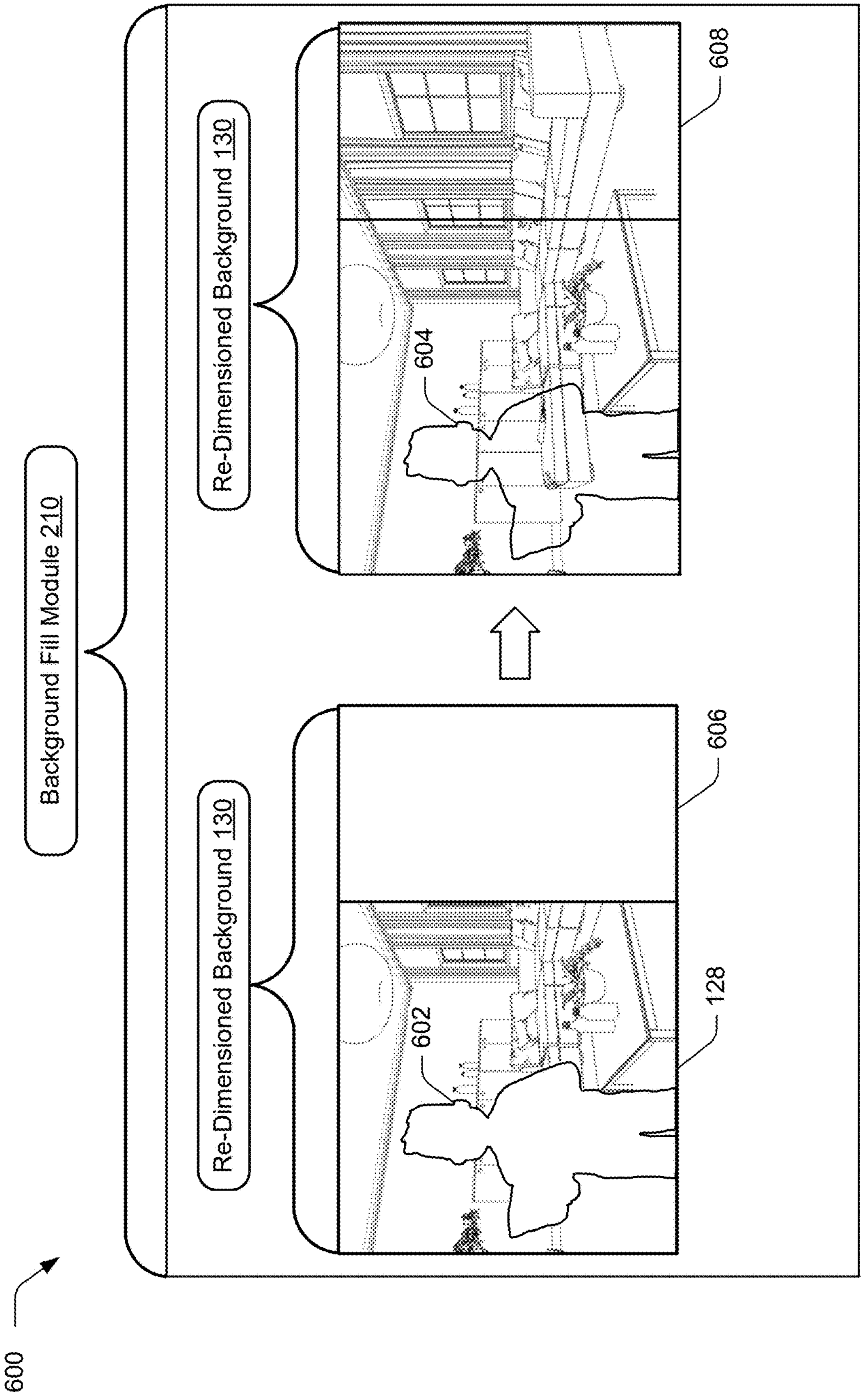
FIG. 6 depicts an example of a background fill module generating a re-dimensioned background.

FIG. 6 depicts an example 600 of a background fill module 210 generating a re-dimensioned background. FIG. 6 is a continuation of the example described in FIG. 4. After the segmentation module 202 segments the foreground object 126 from the background 128, the background fill module 210 fills holes or extended portions in the re-dimensioned background 130.

The background fill module 210 begins in this example by updating a dimension of the background 128 according to the indication of the update to the dimension 124. For example, an update to the dimension 124 involving an expanded dimension involves increasing a width or height of the background 128 according to the update to the dimension 124. An update to the dimension 124 involving a reduced dimension involves decreasing the width or the height of background 128 according to the update to the dimension 124. In this example, the digital image 120 is a 4 inch by 4 inch square, but the update to the dimension 124 specifies a 6 inch by 4 inch rectangle. Because the update to the dimension 124 specifies a larger dimension than the digital image 120, a footprint of the digital image 120 is expanded according to the update to the dimension 124.

The background fill module 210 performs in-painting to fill a background hole 602 in the re-dimensioned background 130 resulting from a foreground object 126 that is shifted, repositioned, or re-sized within the re-dimensioned digital image 118. For instance, segmenting the foreground object 126 from the background 128 results in blank pixels, forming the background hole 602 in the background 128 where pixels belonging to the foreground object 126 were located before segmentation. This is because segmenting the foreground object 126 from the background 128 includes separating pixels belonging to the foreground object 126 from pixels belonging to the background 128. Because the foreground object 126 is located in a different position in the re-dimensioned digital image 118 than in the digital image 120, the background fill module 210 fills the background hole 602 in the re-dimensioned background 130 by generating a background hole fill 604. To do this, the background fill module 210 uses a machine learning model trained on sections of missing content in background images to generate content for the background hole fill 604 based on recognized content in the background 128. The background hole fill 604 matches a resolution, content type, and other visual qualities to the background 128. Added to the re-dimensioned background 130, the background hole fill 604 creates a re-dimensioned background 130 that is cohesive and complete, without content holes.

The background fill module 210 performs out-painting on the re-dimensioned background 130 to fill a missing background extension 606 with a background extension fill 608. This is because the re-dimensioned background 130 includes a blank portion in situations involving an expanded dimension of the background 128 past the footprint of the background 128 based on the update to the background 128. To fill the missing background extension 606, the background fill module 210 uses a machine learning model trained on sections of missing content in background images to generate content for the background extension fill 608 based on recognized content in the background 128. The background extension fill 608 is an extension of the background 128 that visually appears to flow from the background 128. The background extension fill 608 matches a resolution, content type, and other visual qualities to the background 128. Together, the background 128 and the background extension fill 608 form the re-dimensioned background 130.

Figure 7:
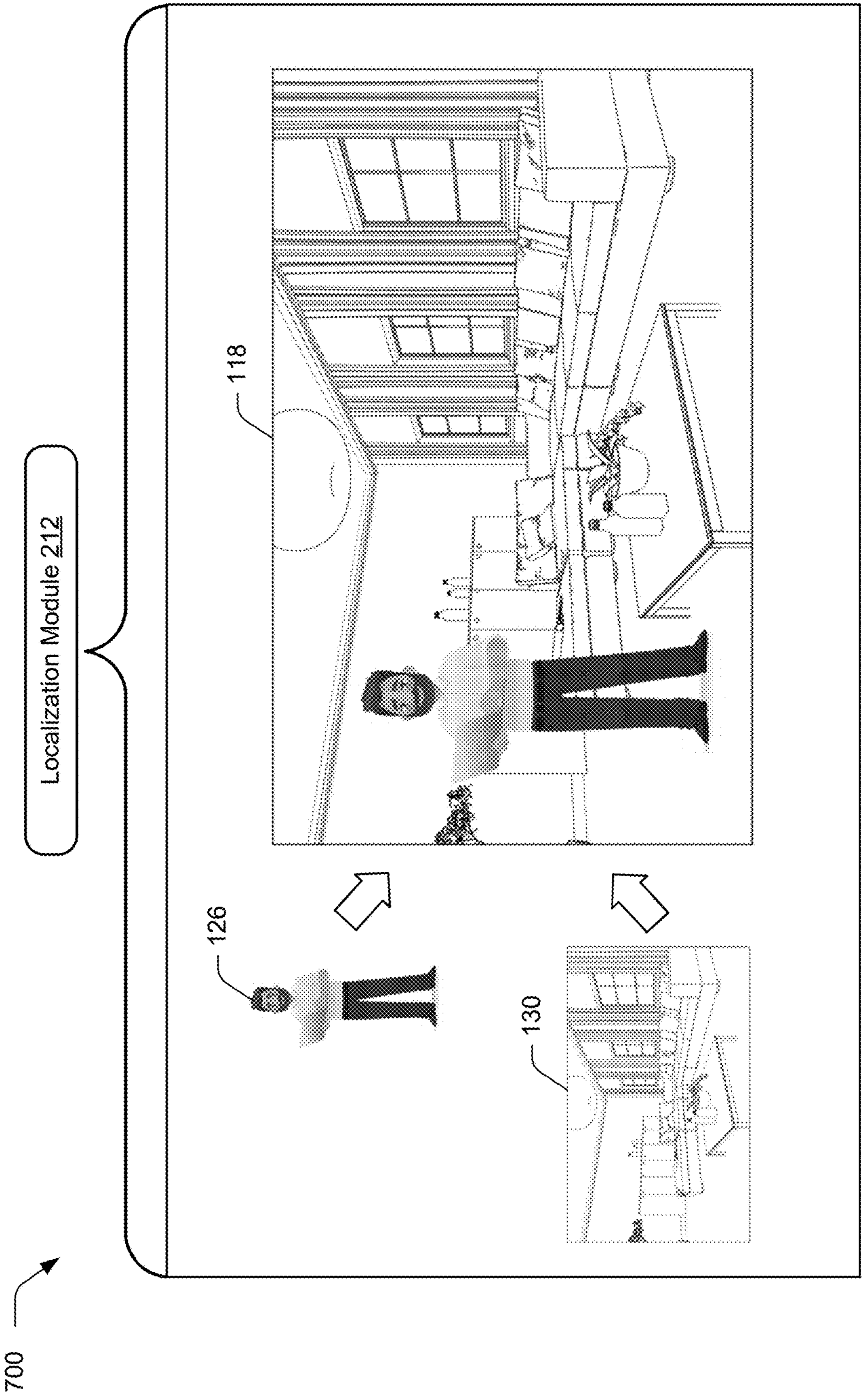
FIG. 7 depicts an example of a localization module positioning the foreground object over the re-dimensioned background to form a re-dimensioned digital image.

FIG. 7 depicts an example 700 of a localization module 212 positioning the foreground object 126 over the re-dimensioned background 130 to form a re-dimensioned digital image 118. FIG. 7 is a continuation of the example described in FIG. 6. After the background fill module 210 fills holes or extended portions in the re-dimensioned background 130, the localization module 212 determines a position for the foreground object 126 over the re-dimensioned background 130.

To determine a position for the foreground object 126 over the re-dimensioned background 130, the localization module 212 uses a machine learning regressor model trained to determine optimal positions and sizes of segmented foreground objects on background images. The machine learning regressor model is a type of model used in supervised learning tasks with a goal to predict a continuous numeric value by learning patterns and relationships in training data to make predictions on new, unseen data. In some examples, the machine learning regressor model determines an optimal position to place the foreground object 126 based on a focal point or center of the re-dimensioned background 130. In other examples, the machine learning regressor model determines an optimal position to place the foreground object 126 that avoids obscuring or covering up salient objects, text, logos, or other content incorporated into the re-dimensioned background 130.

In some examples, the localization module 212 assigns a priority to multiple foreground objects for layering on the re-dimensioned background 130. Foreground objects with lower priority are positioned over the re-dimensioned background 130 first, while foreground objects with higher priority are positioned over the re-dimensioned background 130 later to avoid covering up or obscuring the foreground objects with higher priority.

In some examples, the localization module 212 determines the position for the foreground object 126 over the re-dimensioned background 130 based on a layout of the digital image 120. In this example, the localization module 212 recognizes that the foreground object 126 is located on the left side of the digital image 120, and therefore positions the foreground object 126 on the left side over the re-dimensioned background 130 in the re-dimensioned digital image 118.

In some examples, the display device 112 also re-sizes the foreground object 126 based on dimensions of the re-dimensioned background 130. For example, a re-dimensioned background 130 has larger dimensions than the background 128. Therefore, the display device 112 uses the machine learning regressor model to determine an increase of size relative to the re-dimensioned background 130 to apply to the foreground object 126, including enlarging the foreground object 126. In another example, a re-dimensioned background 130 has smaller dimensions than the background 128. Therefore, the display device 112 uses the machine learning regressor model to determine decrease of size relative to the re-dimensioned background 130 to apply to the foreground object 126, including shrinking the foreground object 126.

Figure 8:
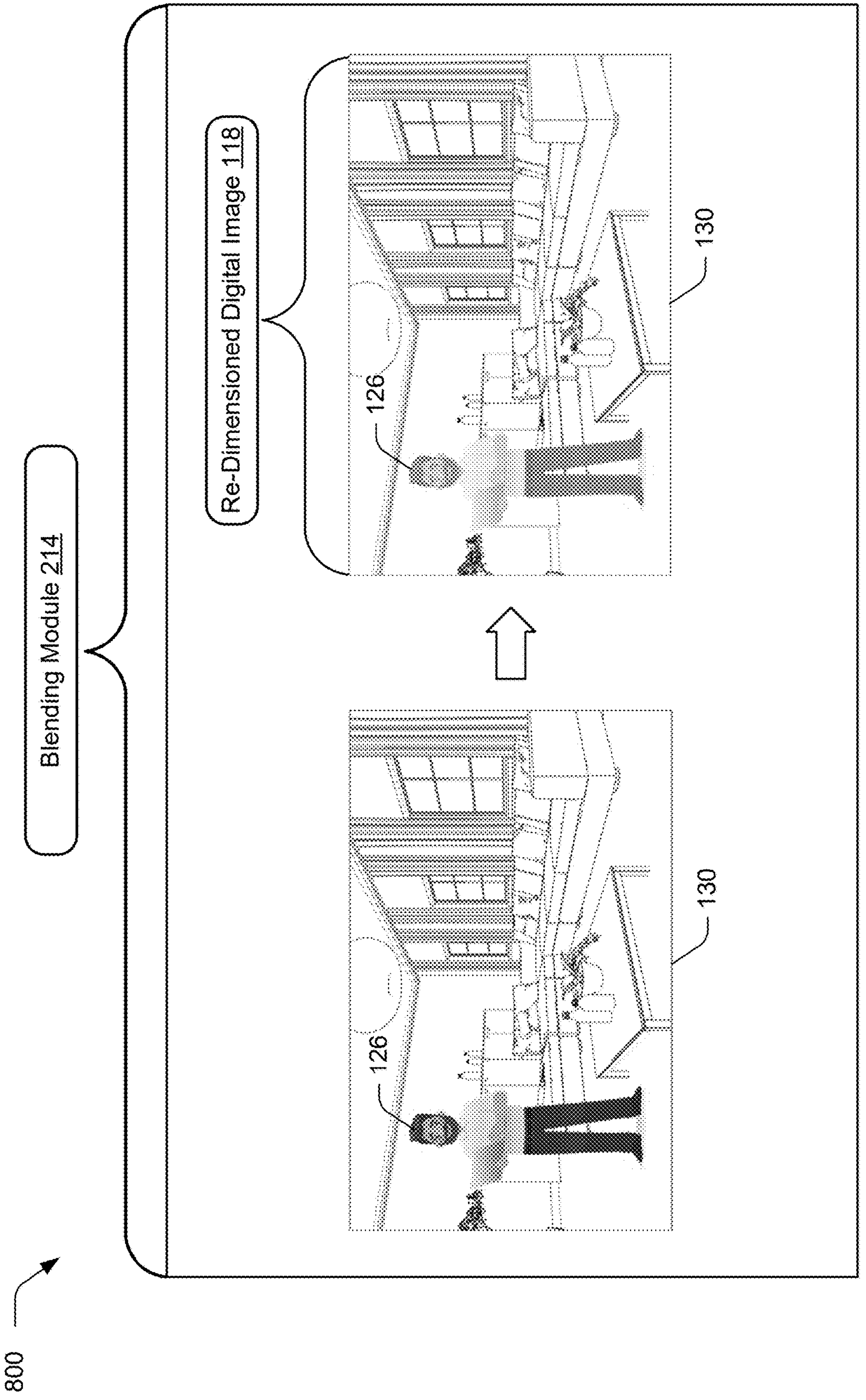
FIG. 8 depicts an example of a blending module blending the foreground object with the re-dimensioned background of the re-dimensioned digital image.

FIG. 8 depicts an example 800 of a blending module 214 blending the foreground object 126 with the re-dimensioned background 130 of the re-dimensioned digital image 118. FIG. 8 is a continuation of the example described in FIG. 7. After the localization module 212 determines the position for the foreground object 126 over the re-dimensioned background 130, the blending module 214 harmonizes the foreground object 126 with the re-dimensioned background 130 by adjusting lighting, contrast, color tone, or other visual properties of the foreground object 126 and the re-dimensioned background 130 to generate a re-dimensioned digital image 118 that is visually cohesive.

The localization module 212 uses Deep Image Harmonization to adjust lighting, contrast, color tone, color saturation, color contrast, white balancing, or other visual properties of the foreground object 126, the re-dimensioned background 130, or both the foreground object 126 and the re-dimensioned background 130.

Lighting refers to the way light interacts with the subjects or objects within the re-dimensioned digital image 118, and how these interactions are captured by a digital camera or sensor. The lighting is described in terms of intensity, which is a brightness of light in the re-dimensioned digital image 118. In some examples, the lighting is also described in terms of color temperature, which describes a type of lighting based on a lighting source. For example, daylight produces neural color temperature lighting, while artificial lighting sources produce warm color temperature lighting or cool color temperature lighting.

Contrast refers to a difference in visual properties between lighter and darker parts of the re-dimensioned digital image 118. The contrast contributes to overall clarity, depth, and visual impact of the re-dimensioned digital image 118 or other digital visual content.

Color tone refers to an overall color cast or dominant color hue that characterizes the re-dimensioned digital image 118, setting a mood, atmosphere, and visual style of the re-dimensioned digital image 118. The color tone results from a combined influence of a color temperature of a light source, color characteristics of objects in a scene depicted in the re-dimensioned digital image 118, and other color adjustments applied during post-processing. For example, warm color tones include predominant colors of red, orange, and yellow, while cool color tones include predominant colors of blue and green.

Other visual properties include color saturation, color contrast, and white balancing. Color saturation refers to an intensity of a color. A level of color saturation is determined by calculating an aggregate saturation of hues present in facial skin, hair, or eyes. Color contrast refers to a difference between different colors. A level of color contrast is determined by calculating a deviation of a person's facial skin, hair, or eye brightness from the person's average brightness. White balancing pertains to a process of removing unnatural color casts from the re-dimensioned digital image 118 so that objects that appear white in real life are rendered as white in the re-dimensioned digital image 118. White balancing takes into account a color temperature of a light source, which refers to a relative warmth or coolness of white light.

In this example, the blending module 214 adjusts color tone of the foreground object 126 to be consistent with a color tone of the re-dimensioned background 130. This results in a re-dimensioned digital image 118 that is visually cohesive because the foreground object 126 and the re-dimensioned background 130 have consistent color tones, resulting in a pleasing aesthetic experience when viewed by a user. The re-dimensioned digital image 118 is then output for display in a user interface 110.

FIG. 9 depicts an example 900 of the machine learning model 902. The machine learning model 902 is used by the segmentation module 202, the foreground extension module 206, the background fill module 210, the localization module 212, and the blending module 214.

The machine learning model 902 is a computer representation that is trained to perform a task absent specific instructions for performing the task. The machine learning model 902 leverages algorithms to learn from known data and to generate outputs that reflect patterns and attributes of the known data. In this example, the machine learning model 902 is a combination of different models to perform various functions of re-dimensioning images based on foreground objects.

The segmentation module 202 leverages a Recognize Anything (RAM) model 904, a Grounding-DINO model 906, an Optical Character Recognition model 908, and a Sensei Image Cutout model 910. The RAM model 904 is trained to recognize and assign tags to objects, faces, or patterns in digital images. The Grounding-DINO model 906 is a zero-shot object detection model generated by combining a Transformer-based DINO detector and grounded pre-training. The Transformer-based DINO detector is a self-supervised model trained to recognize representations from unlabeled data. The Optical Character Recognition detector is trained to generate the bounding box surrounding the foreground object 126. The Optical Character Recognition model 908 converts images of text, including computer-generated, printed, or handwritten, into machine-encoded text, which is identified as a foreground object 126 and enclosed in the bounding box 404. The Sensei Image Cutout model 910 is trained to generates a black and white mask covering the foreground object 126 and segments pixels corresponding to the foreground object 126 from surrounding pixels corresponding to the background 128 based on the mask.

The foreground extension module 206 leverages a Partial Detection model 912 and a Firefly Generation model 914. The Partial Detection model is a binary classifier trained on whole foreground objects and corresponding versions of the whole foreground objects that are missing a portion to determine whether the foreground object 126 is a partial foreground object or a full foreground object. The Firefly Generation model 914 is a diffusion model trained to generate images from text prompts. Implemented by the foreground extension module 206, the Firefly Generation model 914 generates the replacement portion 208 of the foreground object 126 to replace the missing portion 502 of the foreground object 126.

The background fill module 210 leverages the Firefly Generation model 914. Implemented by the background fill module 210, the Firefly Generation model 914 generates the background extension fill 608 to replace the missing background extension 606 in the re-dimensioned background 130.

The localization module 212 leverages a Localization model 916. The localization model 916 is trained to determine positions of foreground objects. For example, the Localization model 916 is trained on optimal aesthetic placement of foreground objects on backgrounds to determine a placement for the foreground object 126 based on a focal point of the re-dimensioned background 130, salient content in the re-dimensioned background 130, readability of text over the re-dimensioned background 130, or other factors related to design of the re-dimensioned digital image 118.

The blending module 214 leverages a Deep Image Harmonization model 918. The Deep Image Harmonization model 918 is trained on edited digital images to edit properties of digital images. For example, the Deep Image Harmonization model 918 adjusts lighting, contrast, color tone, color saturation, color contrast, white balancing, or other visual properties of the foreground object 126, the re-dimensioned background 130, or both the foreground object 126 and the re-dimensioned background 130.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-9.

Figure 10:
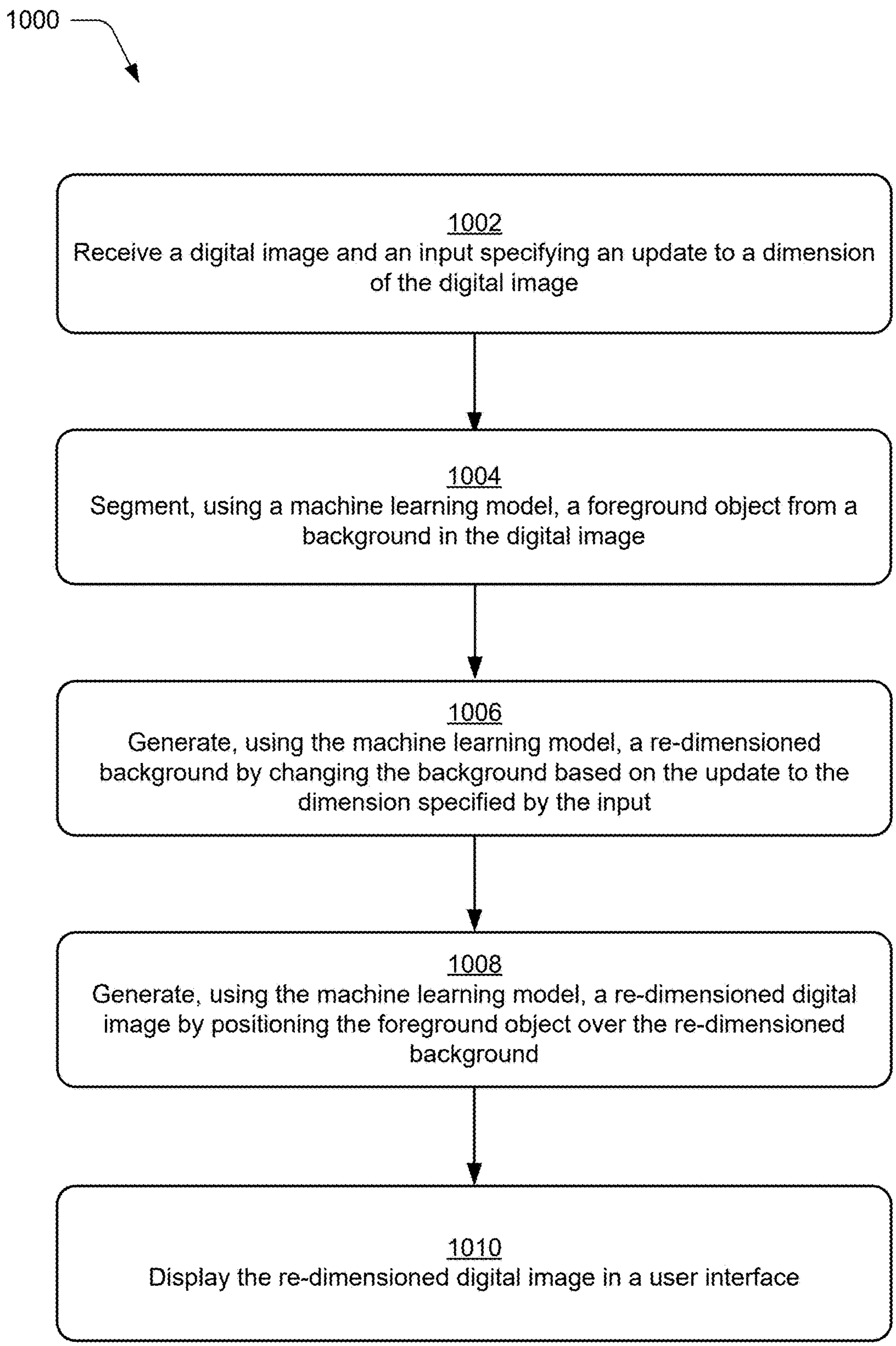
FIG. 10 depicts a procedure in an example implementation of re-dimensioning images based on foreground objects.

FIG. 10 depicts a procedure 1000 in an example implementation of re-dimensioning images based on foreground objects. At block 1002, a digital image 120 and an input 122 specifying an update to a dimension 124 of the digital image 120 are received.

At block 1004, a foreground object 126 is segmented from a background 128 in the digital image 120 using a machine learning model 902. In some examples, the segmenting the foreground object 126 from the background 128 further comprises tagging and assigning a bounding box 404 to the foreground object 126 using the machine learning model 902. Additionally or alternatively, the foreground object 126 is a logo or text depicted in the digital image 120.

At block 1006, a re-dimensioned background 130 is generated using the machine learning model 902 by changing the background 128 based on the update to the dimension 124 specified by the input 122. Some examples further comprise filling in an extended portion of the re-dimensioned background 130 in the re-dimensioned digital image 118 using the machine learning model 902. Additionally or alternatively, some examples further comprise generating an extended portion of the foreground object 126 in the re-dimensioned digital image 118 using the machine learning model 902 based on determining whether the foreground object 126 is cropped in the digital image 120. Some examples further comprise filling in a hole in the re-dimensioned background 130 in the re-dimensioned digital image 118 resulting from repositioning the foreground object 126 in the re-dimensioned digital image 118 using the machine learning model 902.

At block 1008, a re-dimensioned digital image 118 is generated using the machine learning model 902 by positioning the foreground object 126 over the re-dimensioned background 130. Some examples further comprise re-sizing the foreground object 126 based on dimensions of the re-dimensioned background 130. In some examples, the machine learning model 902 determines a position of the foreground object 126 over the re-dimensioned background 130 based on a focal point of the re-dimensioned background 130.

At block 1010, the re-dimensioned digital image 118 is displayed in a user interface 110. Some examples further comprise blending the foreground object 126 with the re-dimensioned background 130 by adjusting at least one of lighting, contrast, or color tone of the foreground object 126 and the re-dimensioned background 130.

Figure 11:
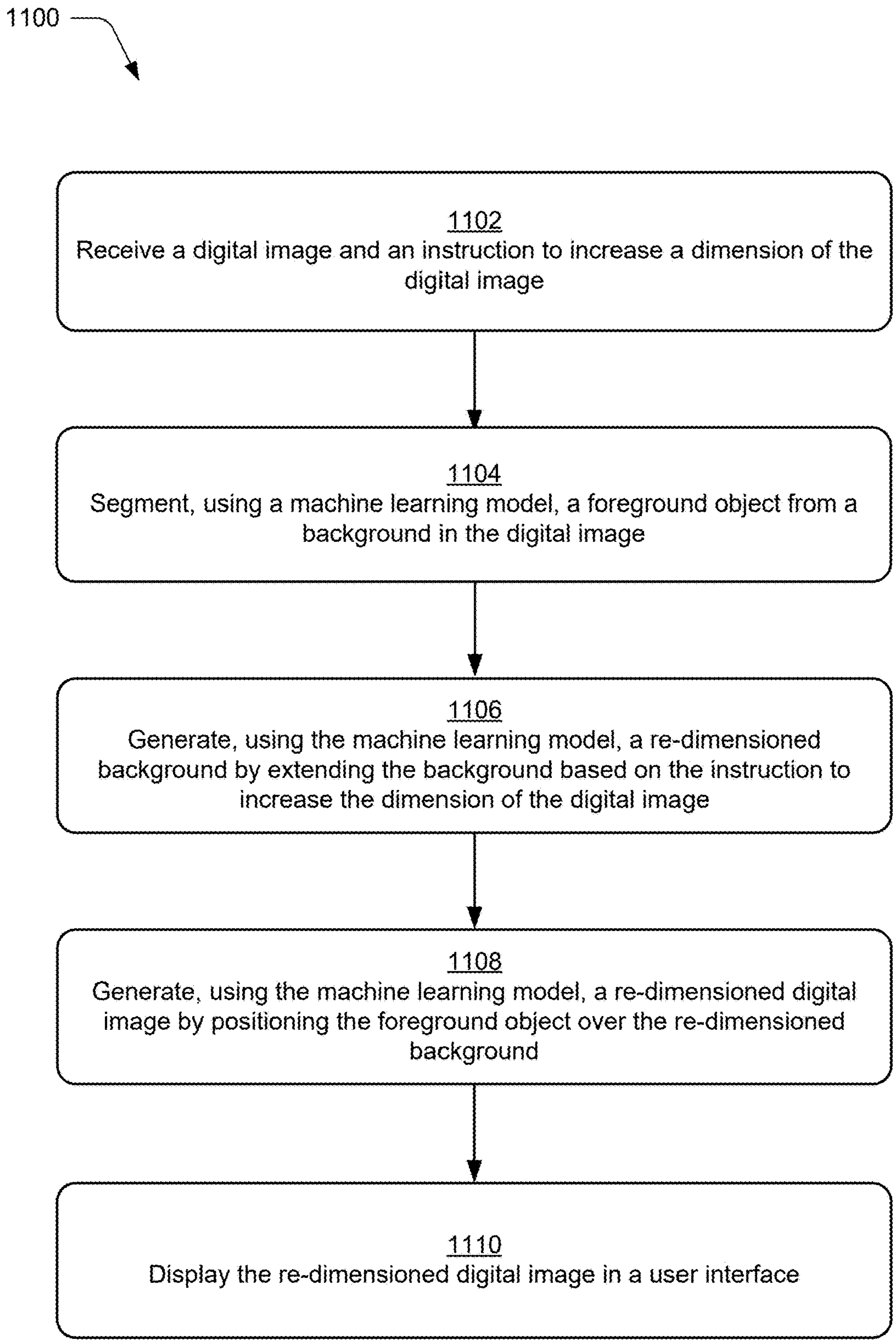
FIG. 11 depicts a procedure in an additional example implementation of re-dimensioning images based on foreground objects.

FIG. 11 depicts a procedure 1100 in an additional example implementation of re-dimensioning images based on foreground objects. At block 1102, a digital image 120 and an instruction to increase a dimension of the digital image 120 are received.

At block 1104, a foreground object 126 is segmented from a background 128 in the digital image 120 using a machine learning model 902.

At block 1106, a re-dimensioned background 130 is generated using the machine learning model 902 by extending the background 128 based on the instruction to increase the dimension of the digital image 120. Some examples further comprise filling in an extended portion of the re-dimensioned background 130 in the re-dimensioned digital image 118 using the machine learning model 902. Additionally or alternatively, some examples further comprise generating an extended portion of the foreground object 126 in the re-dimensioned digital image 118 using the machine learning model 902 based on determining whether the foreground object 126 is cropped in the digital image 120. Some examples further comprise filling in a hole in the re-dimensioned background 130 in the re-dimensioned digital image 118 resulting from repositioning the foreground object 126 in the re-dimensioned digital image 118 using the machine learning model 902.

At block 1108, a re-dimensioned digital image 118 is generated using the machine learning model 902 by positioning the foreground object 126 over the re-dimensioned background 130. Some examples further comprise re-sizing the foreground object 126 based on dimensions of the re-dimensioned background 130. Additionally or alternatively, in some examples the machine learning model 902 determines a position of the foreground object 126 over the re-dimensioned background 130 based on a focal point of the re-dimensioned background 130.

At block 1110, the re-dimensioned digital image 118 is displayed in a user interface 110. Some examples further comprise blending the foreground object 126 with the re-dimensioned background 130 by adjusting at least one of lighting, contrast, or color tone of the foreground object 126 and the re-dimensioned background 130.

Figure 12:
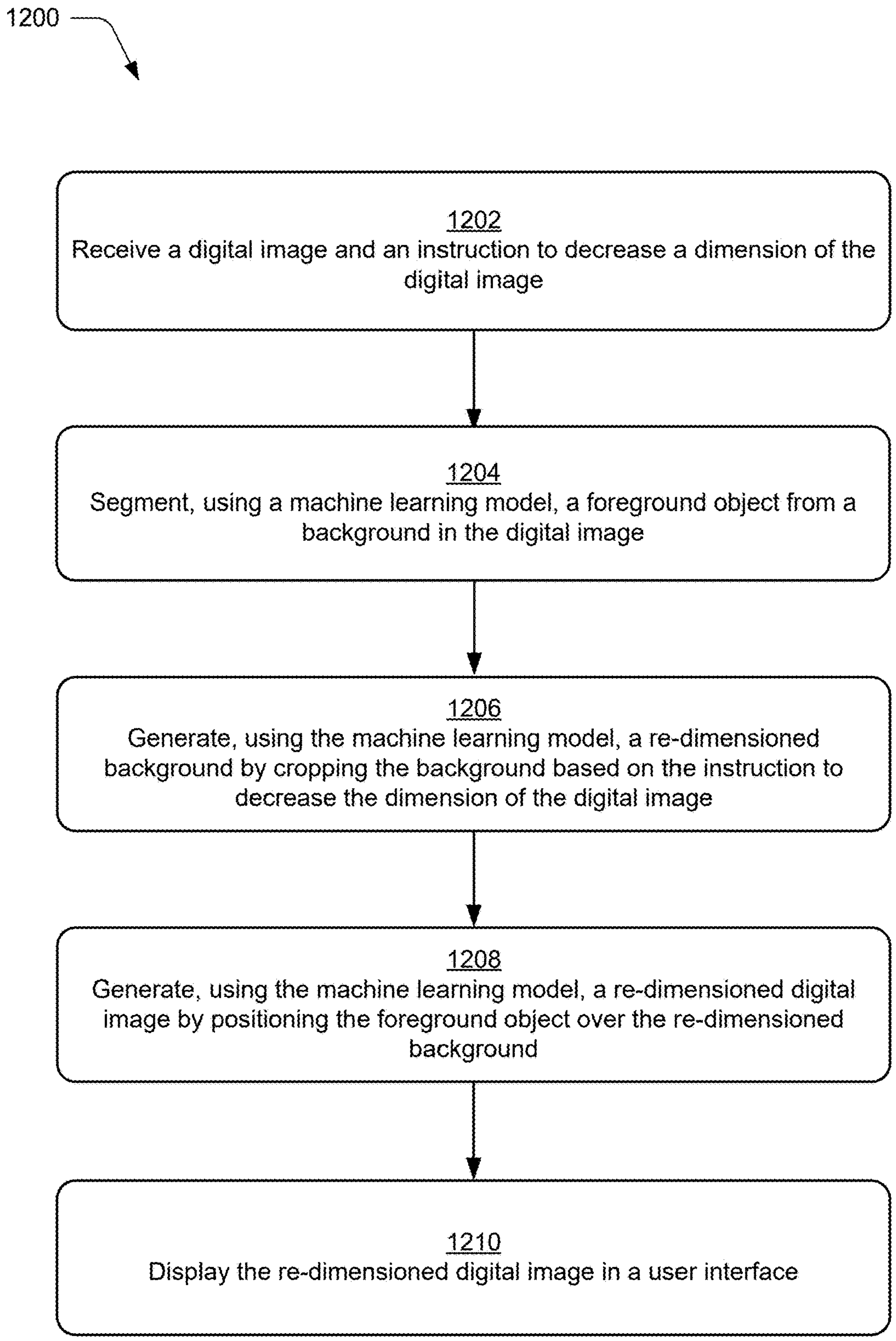
FIG. 12 depicts a procedure in an additional example implementation of re-dimensioning images based on foreground objects.

FIG. 12 depicts a procedure 1200 in an additional example implementation of re-dimensioning images based on foreground objects. At block 1202, a digital image 120 and an instruction to decrease a dimension of the digital image 120 are received.

At block 1204, a foreground object 126 is segmented from a background 128 in the digital image 120 using a machine learning model 902.

At block 1206, a re-dimensioned background 130 is generated using the machine learning model 902 by cropping the background 128 based on the instruction to decrease the dimension of the digital image 120.

At block 1208, a re-dimensioned digital image 118 is generated using the machine learning model 902 by positioning the foreground object 126 over the re-dimensioned background 130. Some examples further comprise re-sizing the foreground object 126 based on dimensions of the re-dimensioned background 130. Additionally or alternatively, the machine learning model 902 determines a position of the foreground object 126 over the re-dimensioned background 130 based on a focal point of the re-dimensioned background 130.

At block 1210, the re-dimensioned digital image 118 is displayed in a user interface 110. Some examples further comprise blending the foreground object 126 with the re-dimensioned background 130 by adjusting at least one of lighting, contrast, or color tone of the foreground object 126 and the re-dimensioned background 130.

Example System and Device

Figure 13:
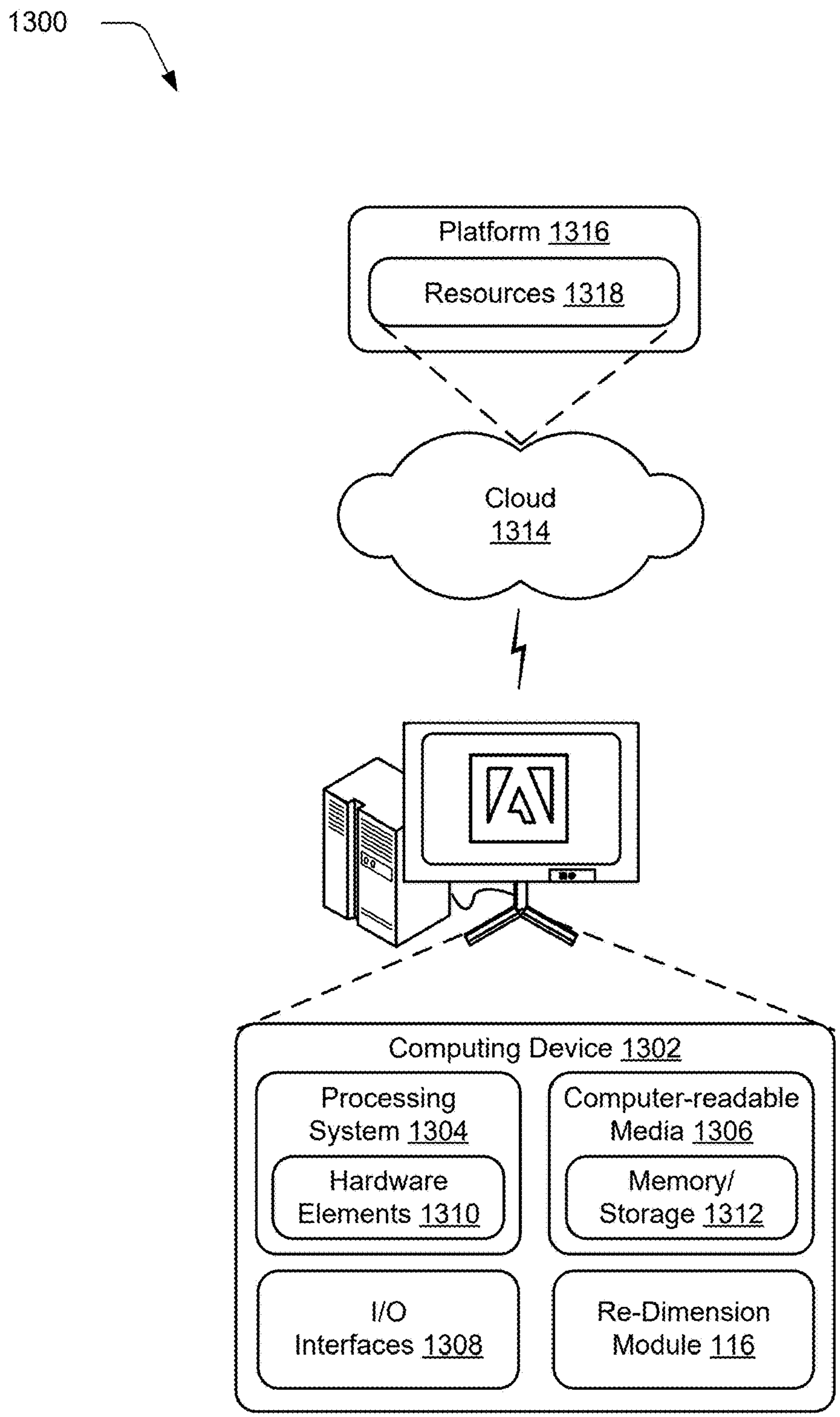
FIG. 13 illustrates an example system including various components of an example device that can be implemented as any type of computing device as described and/or utilized with reference to FIGS. 1-12 to implement embodiments of the techniques described herein.

FIG. 13 illustrates an example system generally at 1300 that includes an example computing device 1302 that is representative of one or more computing systems and/or devices that implement the various techniques described herein. This is illustrated through inclusion of the re-dimension module 116. The computing device 1302 is configurable, for example, as a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that is configurable as processors, functional blocks, and so forth. This includes implementation in hardware as an application specific integrated circuit or other logic device formed using one or more semiconductors. The hardware elements 1310 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1306 is illustrated as including memory/storage 1312. The memory/storage 1312 represents memory/storage capacity associated with one or more computer-readable media. The memory/storage 1312 includes volatile media (such as random access memory (RAM)) and/or nonvolatile media (such as read only memory (ROM), Flash memory, optical disks, magnetic disks, and so forth). The memory/storage 1312 includes fixed media (e.g., RAM, ROM, a fixed hard drive, and so on) as well as removable media (e.g., Flash memory, a removable hard drive, an optical disc, and so forth). The computer-readable media 1306 is configurable in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1302. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1302, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1310. The computing device 1302 is configured to implement particular instructions and/or functions corresponding to the software and/or hardware modules. Accordingly, implementation of a module that is executable by the computing device 1302 as software is achieved at least partially in hardware, e.g., through use of computer-readable storage media and/or hardware elements 1310 of the processing system 1304. The instructions and/or functions are executable/operable by one or more articles of manufacture (for example, one or more computing devices and/or processing systems 1304) to implement techniques, modules, and examples described herein.

The techniques described herein are supported by various configurations of the computing device 1302 and are not limited to the specific examples of the techniques described herein. This functionality is also implementable through use of a distributed system, such as over a "cloud" 1114 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 include applications and/or data that can be utilized when computer processing is executed on servers that are remote from the computing device 1302. Resources 1318 can also include services provided over the Internet and/or through a subscriber network, such as a cellular or Wi-Fi network.

The platform 1316 abstracts resources and functions to connect the computing device 1302 with other computing devices. The platform 1316 also serves to abstract scaling of resources to provide a corresponding level of scale to encountered demand for the resources 1318 that are implemented via the platform 1316. Accordingly, in an interconnected device embodiment, implementation of functionality described herein is distributable throughout the system 1300. For example, the functionality is implementable in part on the computing device 1302 as well as via the platform 1316 that abstracts the functionality of the cloud 1314.

What is claimed is:

1. A method comprising:

receiving, by a processing device, a digital image and an input specifying an update to a dimension of the digital image;

segmenting, by the processing device using a machine learning model, a foreground object from a background in the digital image;

generating, by the processing device using the machine learning model, a re-dimensioned background by changing the background based on the update to the dimension specified by the input;

generating, by the processing device using the machine learning model, a re-dimensioned digital image by positioning the foreground object over the re-dimensioned background and filling a missing area of the re-dimensioned background; and displaying, by the processing device, the re-dimensioned digital image in a user interface.

2. The method of claim 1, further comprising filling in an extended portion of the re-dimensioned background in the re-dimensioned digital image using the machine learning model.

3. The method of claim 1, further comprising generating an extended portion of the foreground object in the re-dimensioned digital image using the machine learning model based on determining whether the foreground object is cropped in the digital image.

4. The method of claim 1, wherein the missing area of the re-dimensioned background is a result of repositioning the foreground object in the re-dimensioned digital image using the machine learning model.

5. The method of claim 1, wherein the segmenting the foreground object from the background further comprising tagging and assigning a bounding box to the foreground object using the machine learning model.

6. The method of claim 1, further comprising re-sizing the foreground object based on dimensions of the re-dimensioned background.

7. The method of claim 1, wherein the machine learning model determines a position of the foreground object over the re-dimensioned background based on a focal point of the re-dimensioned background.

8. The method of claim 1, further comprising blending the foreground object with the re-dimensioned background by adjusting at least one of lighting, contrast, or color tone of the foreground object and the re-dimensioned background.

9. The method of claim 1, wherein the foreground object is a logo or text depicted in the digital image.

10. A system comprising:

a memory component; and a processing device coupled to the memory component, the processing device to perform operations comprising:

receiving a digital image and an instruction to increase a dimension of the digital image;

segmenting, using a machine learning model, a foreground object from a background in the digital image;

generating, using the machine learning model, a re-dimensioned background by extending the background based on the instruction to increase the dimension of the digital image;

generating, using the machine learning model, a re-dimensioned digital image by positioning the foreground object over the re-dimensioned background and filling a missing area of the re-dimensioned background; and displaying the re-dimensioned digital image in a user interface.

11. The system of claim 10, further comprising filling in an extended portion of the re-dimensioned background in the re-dimensioned digital image using the machine learning model.

12. The system of claim 10, further comprising generating an extended portion of the foreground object in the re-dimensioned digital image using the machine learning model based on determining whether the foreground object is cropped in the digital image.

13. The system of claim 10, wherein the missing area of the re-dimensioned background is a result of repositioning the foreground object in the re-dimensioned digital image using the machine learning model.

14. The system of claim 10, further comprising re-sizing the foreground object based on dimensions of the re-dimensioned background.

15. The system of claim 10, wherein the machine learning model determines a position of the foreground object over the re-dimensioned background based on a focal point of the re-dimensioned background.

16. The system of claim 10, further comprising blending the foreground object with the re-dimensioned background by adjusting at least one of lighting, contrast, or color tone of the foreground object and the re-dimensioned background.

17. A non-transitory computer-readable storage medium storing executable instructions, which when executed by a processing device, cause the processing device to perform operations comprising:

receiving a digital image and an instruction to decrease a dimension of the digital image;

segmenting, using a machine learning model, a foreground object from a background in the digital image;

generating, using the machine learning model, a re-dimensioned background by cropping the background based on the instruction to decrease the dimension of the digital image;

generating, using the machine learning model, a re-dimensioned digital image by positioning the foreground object over the re-dimensioned background and filling a missing area of the re-dimensioned background; and displaying the re-dimensioned digital image in a user interface.

18. The non-transitory computer-readable storage medium of claim 17, further comprising re-sizing the foreground object based on dimensions of the re-dimensioned background.

19. The non-transitory computer-readable storage medium of claim 17, wherein the machine learning model determines a position of the foreground object over the re-dimensioned background based on a focal point of the re-dimensioned background.

20. The method of claim 1, further comprising determining a position for the foreground object over the re-dimensioned background that avoids covering an identified area of the re-dimensioned background.

* * * * *